(No Model.) 10 Sheets—Sheet 4.

J. H. PENDLETON & A. BRYSON, Jr.
SAFETY AND ANTI FRICTION DEVICE FOR RAILROAD CURVES.

No. 415,556. Patented Nov. 19, 1889.

(No Model.) 10 Sheets—Sheet 5.
J. H. PENDLETON & A. BRYSON, Jr.
SAFETY AND ANTI FRICTION DEVICE FOR RAILROAD CURVES.
No. 415,556. Patented Nov. 19, 1889.

(No Model.) 10 Sheets—Sheet 6.

J. H. PENDLETON & A. BRYSON, Jr.
SAFETY AND ANTI FRICTION DEVICE FOR RAILROAD CURVES.

No. 415,556. Patented Nov. 19, 1889.

Witnesses.
John F. Nelson
George S. Bell

Inventors.
John H. Pendleton
Andrew Bryson Jr.
By Knight Bros
Attys

(No Model.) 10 Sheets—Sheet 7.

J. H. PENDLETON & A. BRYSON, Jr.
SAFETY AND ANTI FRICTION DEVICE FOR RAILROAD CURVES.

No. 415,556. Patented Nov. 19, 1889.

Witnesses.
John F. Nelson
George S Bell

Inventors.
John H. Pendleton
Andrew Bryson Jr.
By Knight Bros
attys (No Model.) 10 Sheets—Sheet 9.

J. H. PENDLETON & A. BRYSON, Jr.
SAFETY AND ANTI FRICTION DEVICE FOR RAILROAD CURVES.

No. 415,556. Patented Nov. 19, 1889.

Witnesses.
John F. Nelson.
George S. Bell.

Inventors.
John H. Pendleton
Andrew Bryson Jr.
By Knight & Bros
Attys

(No Model.) 10 Sheets—Sheet 10.

J. H. PENDLETON & A. BRYSON, Jr.
SAFETY AND ANTI FRICTION DEVICE FOR RAILROAD CURVES.

No. 415,556. Patented Nov. 19, 1889.

Witnesses
John F. Nelson
George S. Bell

Inventors
John H. Pendleton
Andrew Bryson Jr.
By Knight Bros
Attys

UNITED STATES PATENT OFFICE.

JOHN H. PENDLETON, OF BROOKLYN, AND ANDREW BRYSON, JR., OF NEW YORK, N. Y., ASSIGNORS OF ONE-HALF TO CORNELIUS TIERS, OF NEW YORK, N. Y., AND ALEXANDER H. TIERS, OF MORRISTOWN, NEW JERSEY.

SAFETY AND ANTI-FRICTION DEVICE FOR RAILROAD-CURVES.

SPECIFICATION forming part of Letters Patent No. 415,556, dated November 19, 1889.

Application filed May 29, 1889. Serial No. 312,604. (No model.)

*To all whom it may concern:*

Be it known that we, JOHN H. PENDLETON, residing at Brooklyn, in the county of Kings and State of New York, and ANDREW BRYSON, Jr., residing at New York, in the county of New York and State of New York, have jointly invented certain new and useful Improvements in Safety and Anti-Friction Devices for Railway-Curves; and we do hereby declare the following to be a full, clear, and exact description of the invention, such as will enable others skilled in the art to which it appertains to make and use the same.

Our devices relate partly to improvements in the track and guard rail of railway-curves, and partly in improvements in the parts of cars that engage therewith.

In the accompanying drawings, Fig. 10 is an axial section, Fig. 13 is a plan, and Fig. 14 is an outer face elevation, of the same form. In those of the above figures in which the lateral guard-roller is shown it is represented journaled in a projection from the truck-frame equalizing-bar.

We will first describe what we regard as the typical form of our invention illustrated in Figs. 1, 4, 5, 6, 7, and 8.

1 may represent straight portions of a railway-track.

2 may represent the shorter and 3 the longer rails of the curved portions. In our arrangement either the shorter or the longer curved portion consists of a rail distinct from the rail of the straight portion and slightly out of direct alignment with and extending for a short distance alongside of it. The thus side by side overlapping ends of straight and curved portions are curved downward, as at 4, to enable our hereinafter-described compound truck-wheels to roll from one to the other without jar.

Figures 4, 5:
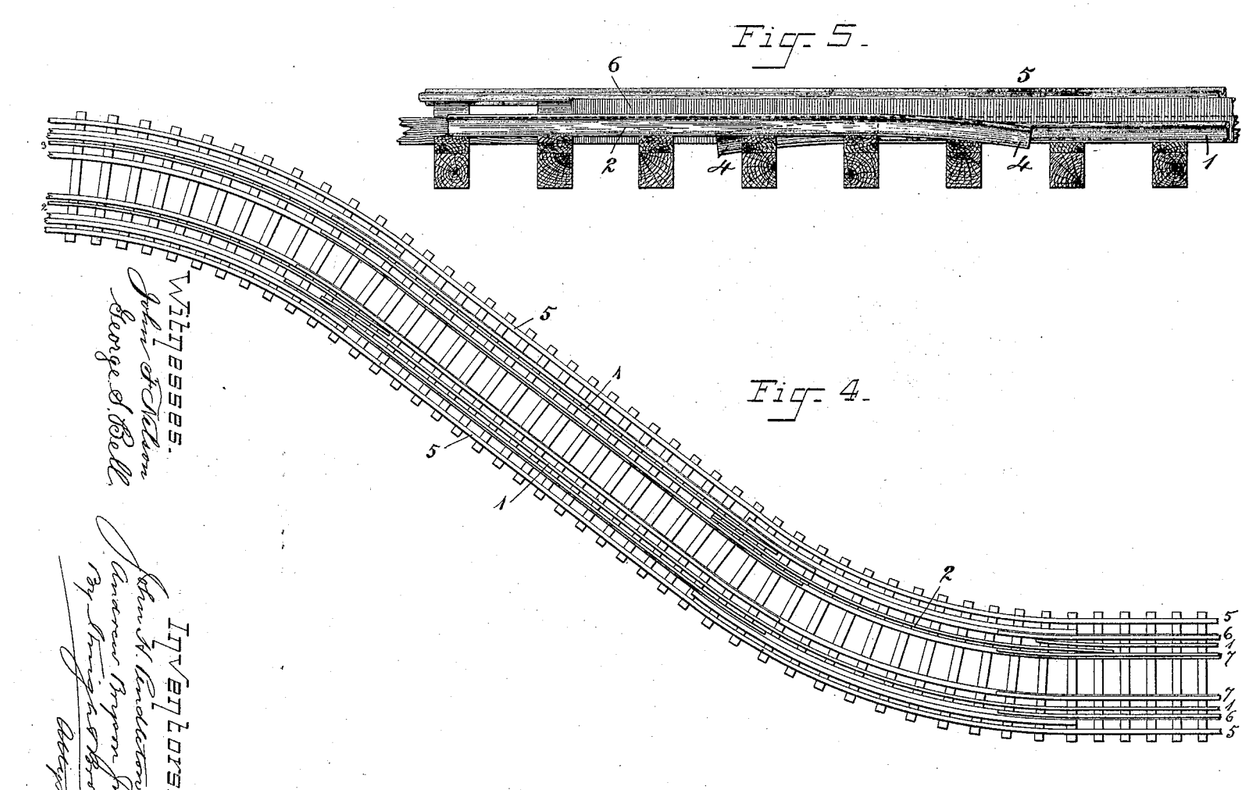
Fig. 4 is a plan of the track represented in Fig. 1, the rails which receive the lateral thrust and the various guard-rails being also shown.
Fig. 5 is an elevation of an inner face of the same rail at one of the change-places.
Figure 6:
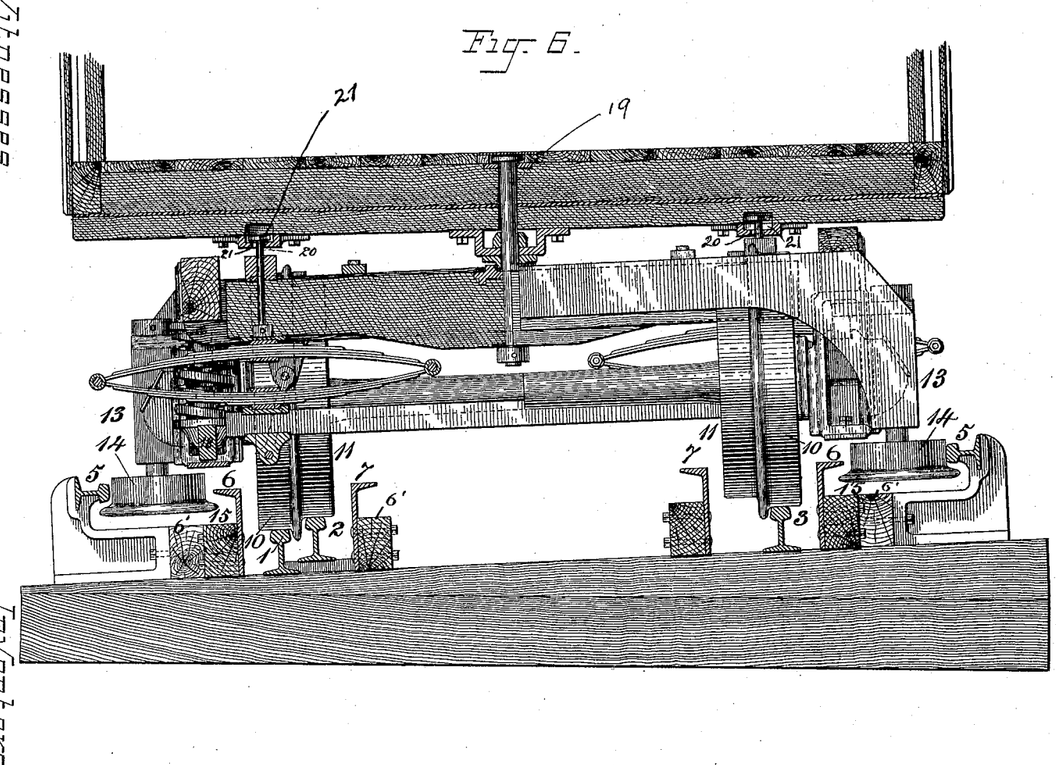
Fig. 6 is a transverse section of track and a car-truck for the form of our invention illustrated in Figs. 1, 4, and 5.
Figure 7:
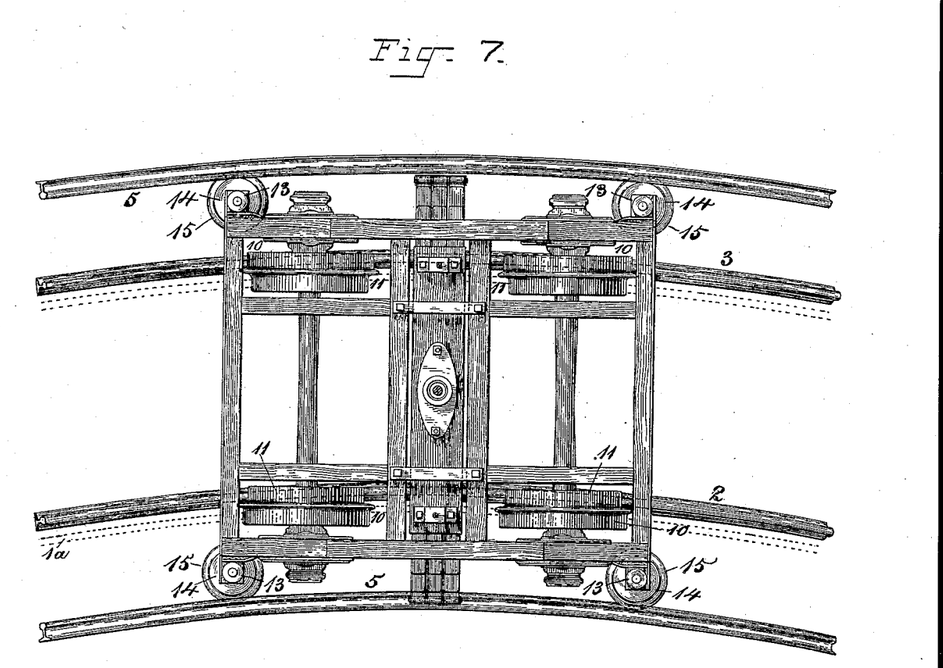
Fig. 7 is a plan view of the same.
Figure 8:
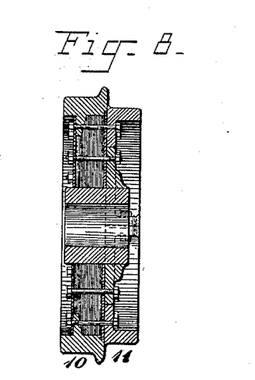
Fig. 8 is an axial section, and Fig. 8' is an inner face view, of the form of wheel employed in the same.

Outside of and parallel to the track are lateral inwardly-presented guard-rails 5, to receive the centrifugal stress of our horizontal guard and anti-friction wheels, hereinafter described, and to thereby relieve the supporting-rails and the flanges of the truck-wheels from the grinding and destructive action of lateral contact on the outer curves. Said guard-rails, furthermore, coact with the flanges on the lower margins of said guard-wheels to prevent excessive careening and to make derailment impossible. Flanged guard-plates 6 (which may be attached to the customary guard-strips 6') on the inner side of guard-wheels, and, where desired, other guard-plates 7 on the inside of the track-wheels, may afford additional elements of security. Such guard-rail and guard-plate (one or both) may extend the entire length of the route, as represented in Fig. 4, or they may be restricted to the more dangerous parts of the curves.

Associated with the above-described provisions in the track are the safety and antifriction devices on the car-truck now to be explained. The typical form will be that first described.

Bolted or otherwise firmly secured to the inner face of each track-wheel 10 is a supplementary tread 11, of as much smaller relative diameter as the length of the shorter curve 2 is less than that of the longer curve 3. The supplementary tread 11 and the shorter-curve rail being equally distant from the middle of the track, it ensues that when the truck reaches this part of the track the side of the truck which is directed toward the shorter curve rests by said supplementary tread on said curve, and by reason of the relative limited circumference of said tread the speed of travel is slackened on that side just sufficiently to preserve the parallelism of the truck-wheels with the track, thus avoiding or greatly lessening tendency to derailment and the usual wasteful and disagreeable grinding action.

As an auxiliary safeguard and anti-friction expedient, we journal vertically, or nearly so, in boxes 13, which at or near each truck-corner are attached to or constitute the terminals of the equalizer-bar 18, a guard-wheel 14, whose lower margin is encircled by a flange 15. Each flanged guard-wheel 14 15, the guard-rail 5, and flanged guard-plates 6 have such relative location as to correct any incipient tendency to derailment and to co-act with the differentiated inner and outer track-wheels in holding the truck to its proper course upon the track.

For additional safeguard against separation of the car-body from the truck, we provide, in addition to the customary king-bolt or center bolt 19, two auxiliary safety-bolts 20, whose heads occupy slots 21 in the body. Thus, should the center bolt, from crystallization or otherwise, become brittle and snap, as frequently occurs, the auxiliary bolts will prevent separation of the car-body from the trucks. Our arrangement thus provides three distinct safeguards against separation or overturning—namely, the customary center bolt, the auxiliary bolts, and the flanged guard-wheels.

Figure 1:
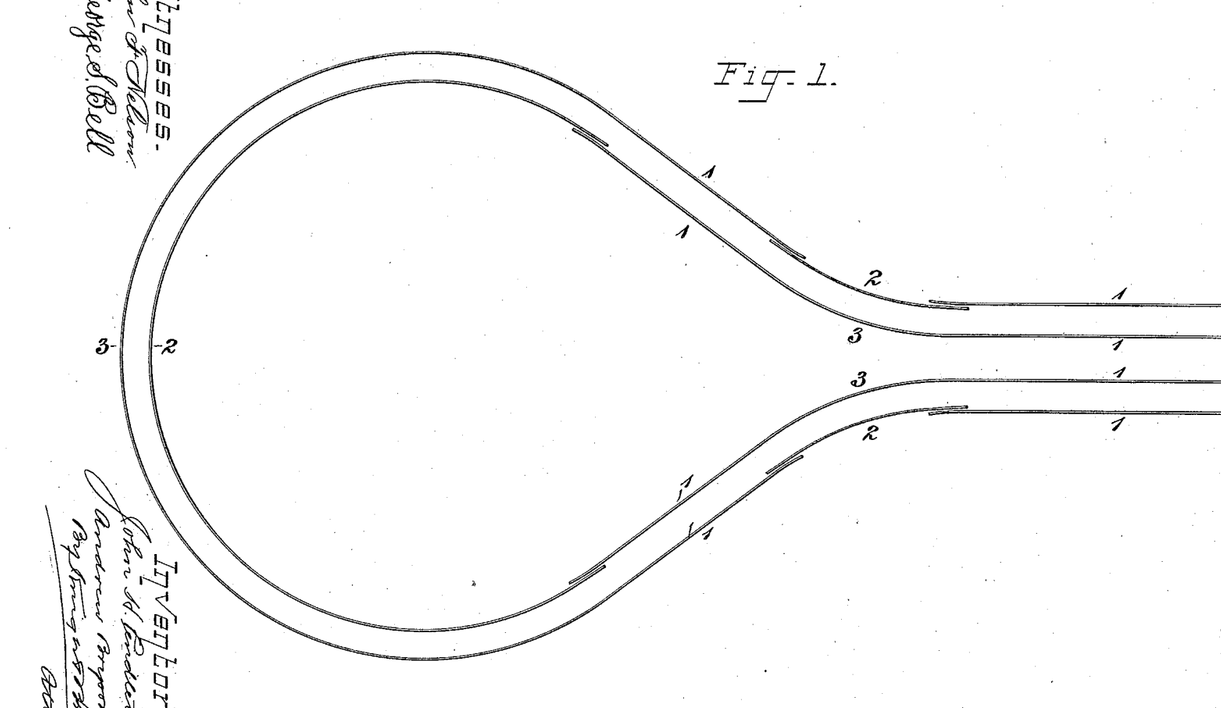
Figure 1 is a plan of a railway-curve adapted for that form of our invention whose auxiliary wheels are on the inner face of the track-wheels proper and coact with auxiliary rails at the inner curves.
Figure 2:
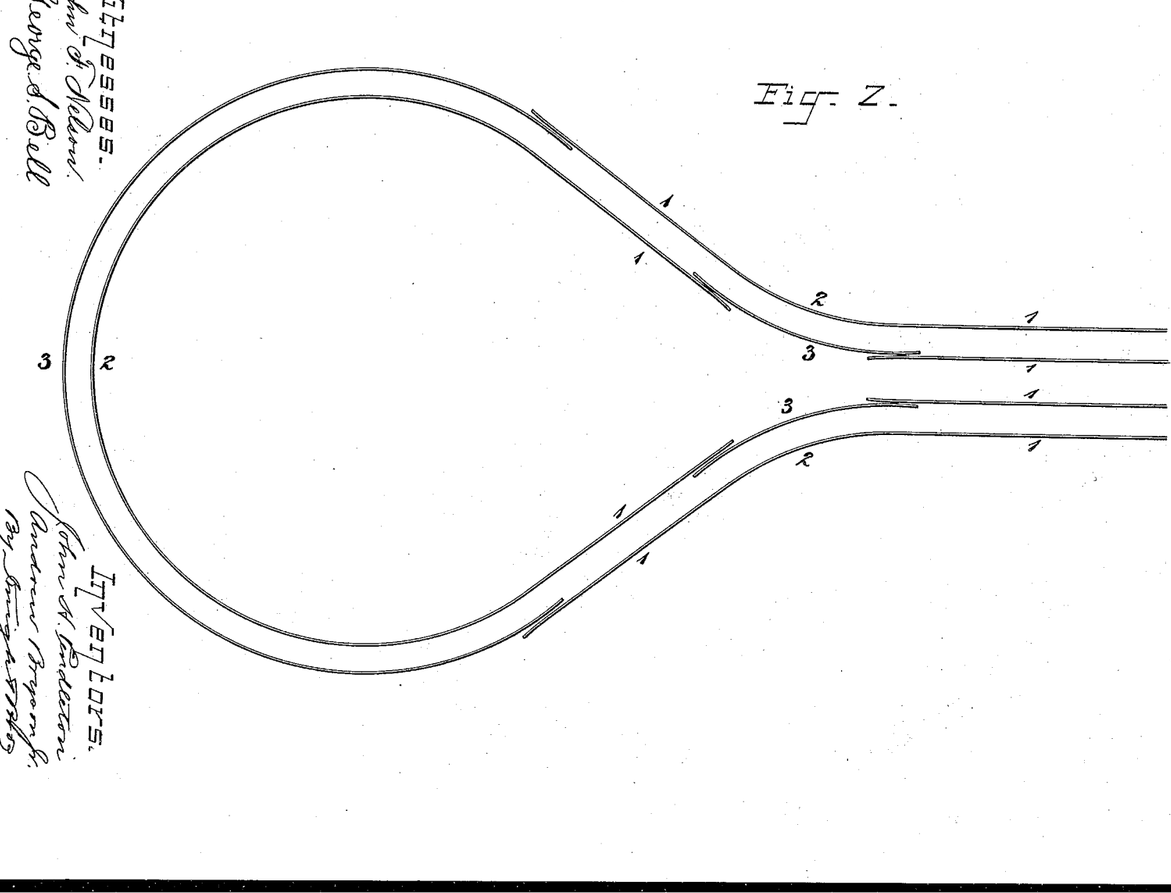
Fig. 2 is a plan of a railway-curve adapted for that form of our invention whose auxiliary wheels, while on the inner face of the track-wheels proper, are adapted to coact with auxiliary rails at the outer curves.
Figure 9:
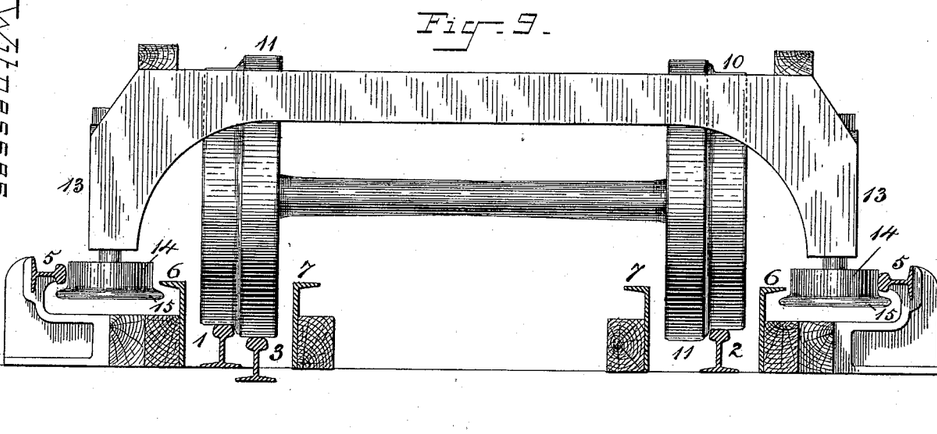
Fig. 9 is a transverse section of track and a car-truck for the form of our invention illustrated in Fig. 2.
Figure 10:
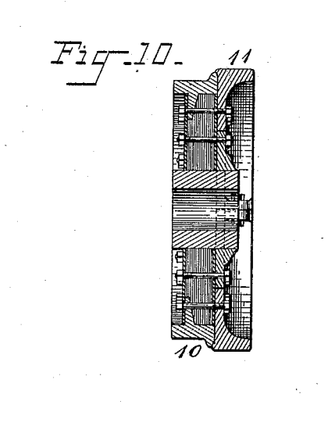
Figure 11:
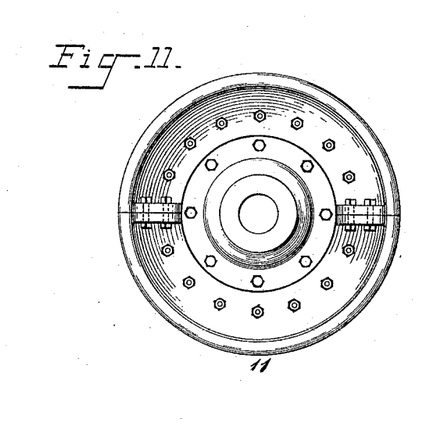
Fig. 11 is an inner face view, of the form of wheel employed in the same.
Figure 12:
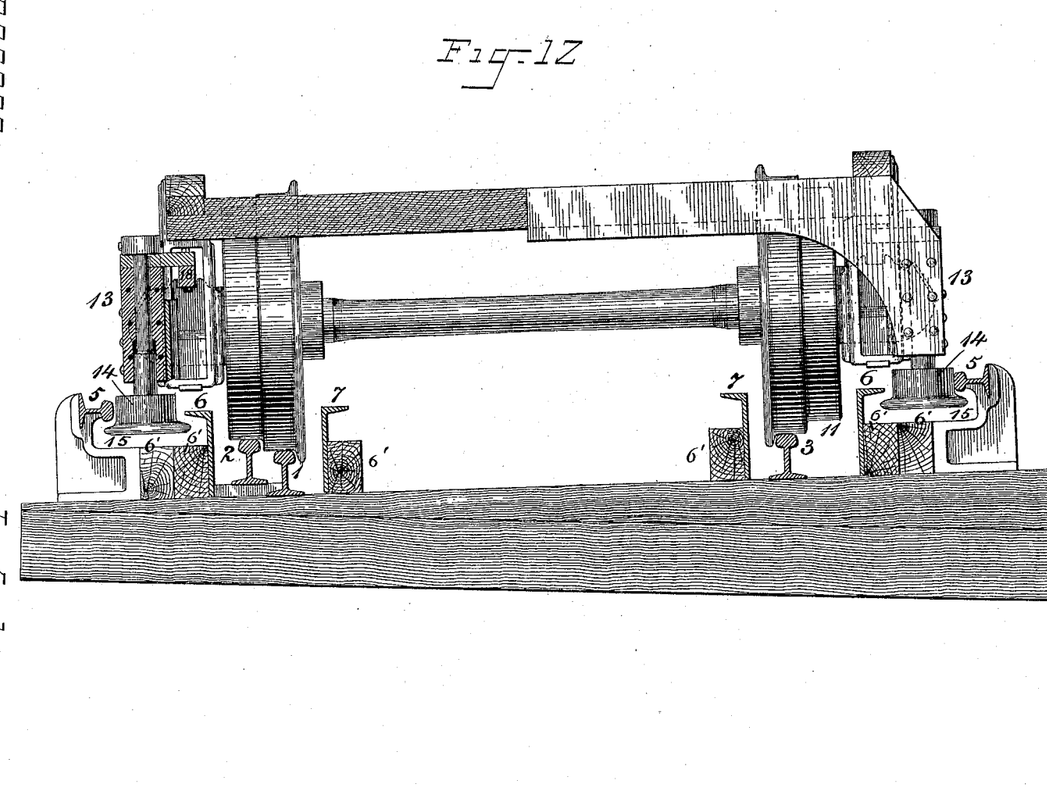
Fig. 12 is a transverse section of track and a car-truck for the form of our invention illustrated in Fig. 3.
Figure 13:
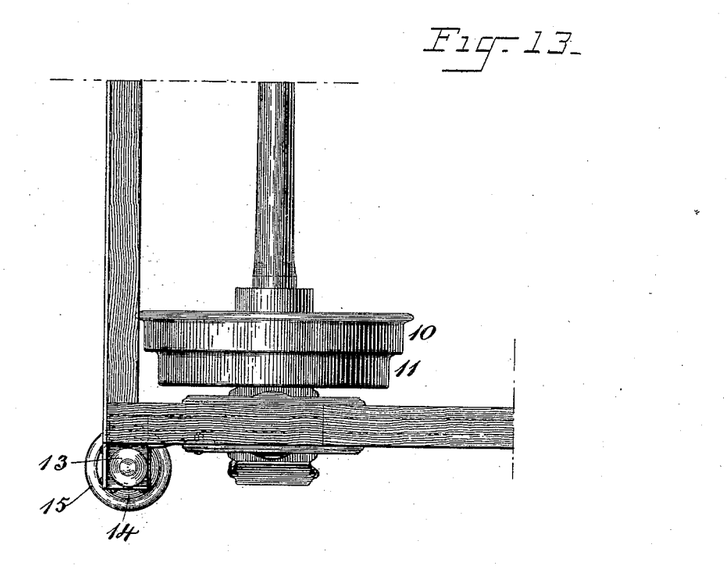
Figure 14:
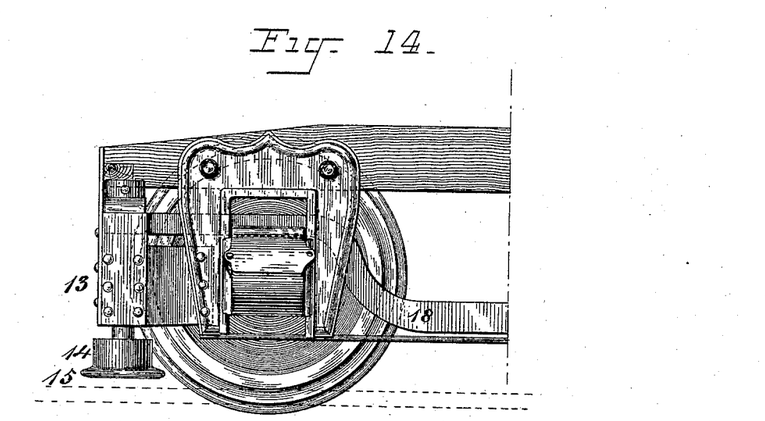

For most situations the form of our invention above described will be the preferred one; but in some cases the supplementary tread, instead of being smaller than the tread proper, may be larger than it, as shown in Figs. 9, 10, and 11, and will operate on a detached rail on the longer side of the curve, as shown in Fig. 2.

Figure 3:
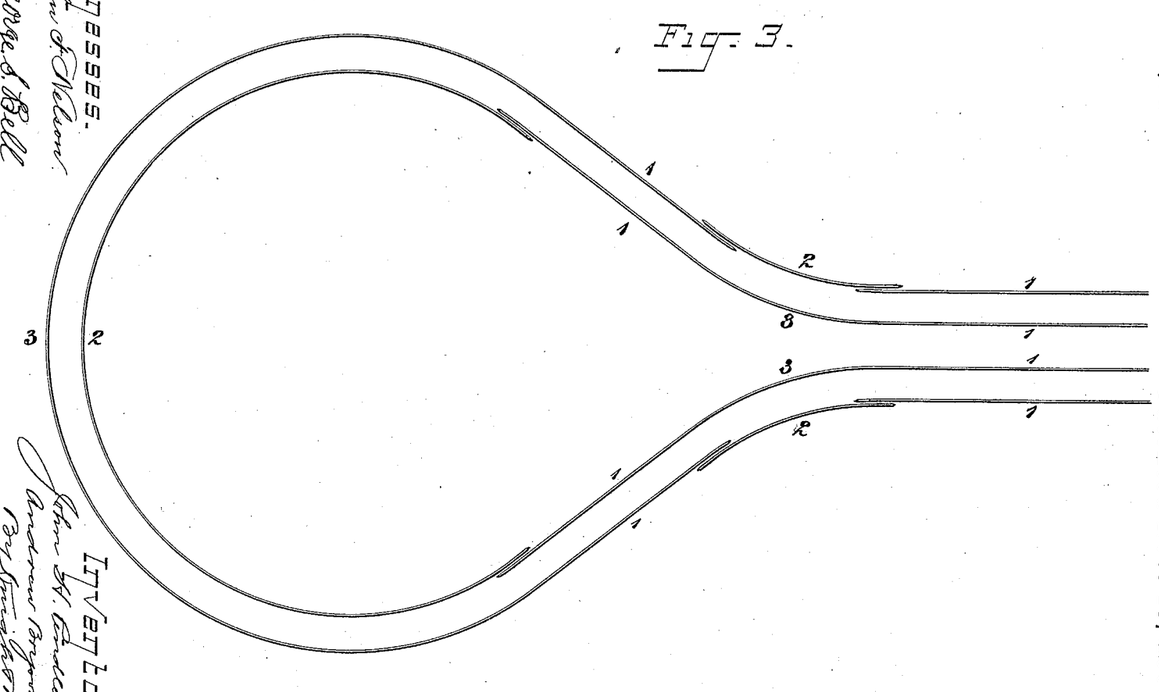
Fig. 3 is a plan of a railway-curve adapted for that form of our invention whose auxiliary wheels are on the outer face of the track-wheels proper and are adapted to coact with auxiliary rails on the inner curves. In the above figures the supporting-rails only are shown.
Figure 15:
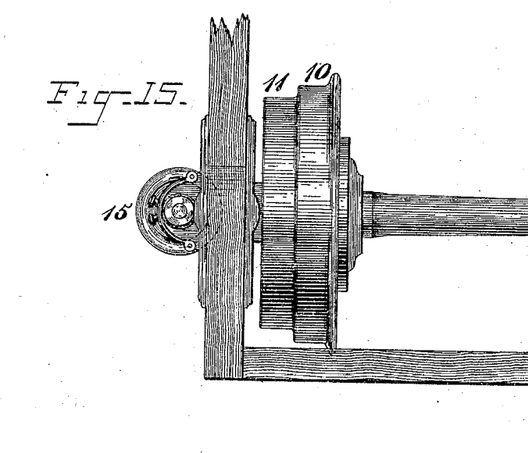
Figs. 15, 16, and 17 are, respectively, a plan, a transverse section, and an outer face elevation, of a form which differs from that shown in Figs. 12, 13, and 14 only in the lateral guard-roller being journaled in a projection from the axle-box.
Figure 16:
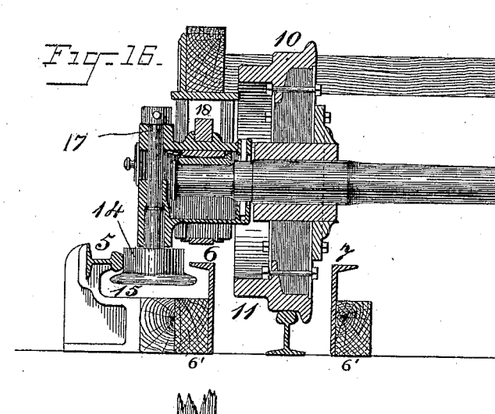
Figure 17:
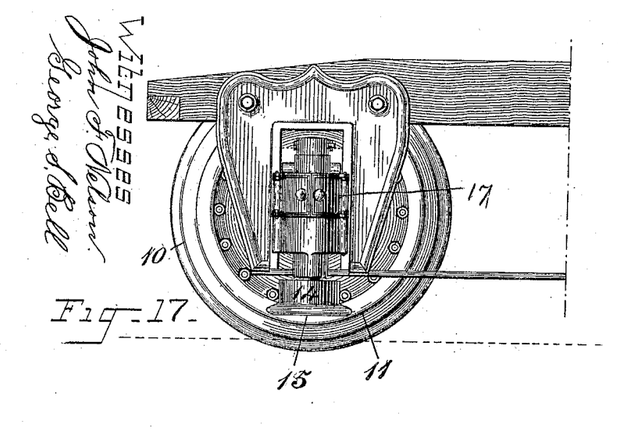

Still another modification may consist in attaching the supplementary tread on the outer surface of the wheel proper, as shown in Figs. 15, 16, and 17. For this form of my invention an arrangement of track such as shown in Fig. 3 is provided.

The flanged guard-wheel boxes, instead of being attached to or supported from the equalizer-bar, may be secured to the boxes 17 of the truck-wheel journals, as shown in Figs. 15, 16, and 17.

Instead of being discontinued at the place of the supplementary curve-rail, the main-track rail may be continuous. (See broken line $1^a$, Fig. 7.)

We claim herein as new and of our invention—

1. The combination, with a lateral guard-rail or flanged plate parallel to and skirting the track-rail, of two or more horizontal flanged guard-wheels journaled to or upon the truck, for the purpose set forth.

2. The combination, with a lateral guard-rail or flanged plate parallel to and skirting the track-rail, of two or more horizontal flanged guard-wheels journaled within projections of the axle-boxes, as set forth.

3. The combination, with a main track, of detached inner curve-rails of greater height than the main track, flanged guard-rails skirting said track, a truck whose wheels have two treads of unequal diameter, and journaled to whose frame or axle-boxes are flanged horizontal wheels that engage said guard-rails, as and for the purpose set forth.

4. The combination of flanged guard-wheels 14 15 and the flanged guard plates or rails 5 6 on either side of said wheels, substantially as and for the purpose set forth.

5. The combination, with the flanged guard plates or rails, of the flanged guard-wheels journaled in boxes supported upon or attached to the equalizer-bar, substantially as set forth.

6. The combination, with the main track, of detached inner curve-rails of greater height than the main track, guard-rails 5, arranged parallel to and skirting the said main track, and a truck whose wheels have two treads of unequal diameter and provided with horizontal wheels journaled within the frame of the truck, said wheels being adapted to engage with the guard-rails, as and for the purposes set forth.

In testimony whereof we hereunto affix our signatures in presence of two witnesses.

JOHN H. PENDLETON.
ANDREW BRYSON, Jr.

Witnesses:
HARRY E. KNIGHT,
GEORGE S. BELL.